United States Patent [19]
Hollier

[11] Patent Number: 6,044,147
[45] Date of Patent: Mar. 28, 2000

[54] TELECOMMUNICATIONS SYSTEM

[75] Inventor: Michael Peter Hollier, Ipswich, United Kingdom

[73] Assignee: British Teledommunications public limited company, London, United Kingdom

[21] Appl. No.: 08/927,536

[22] Filed: Sep. 11, 1997

Related U.S. Application Data

[63] Continuation of application No. 08/648,610, May 16, 1996, abandoned.

[51] Int. Cl.[7] .............................. H04M 1/64; H04M 1/00
[52] U.S. Cl. ...................... 379/338; 379/88.07; 379/339; 379/344; 379/346
[58] Field of Search ................................ 379/67.1, 88.07, 379/88.08, 100.14, 219, 225, 338, 339, 340, 341, 342, 343, 344, 345, 346, 347, 348; 704/208, 219

[56] References Cited

U.S. PATENT DOCUMENTS

| | | | |
|---|---|---|---|
| 4,277,655 | 7/1981 | Suprenant | 379/340 |
| 4,413,240 | 11/1983 | Dyke | 379/340 |
| 4,592,068 | 5/1986 | Jessop et al. | 379/340 |
| 4,742,550 | 5/1988 | Fette | 381/36 |
| 4,979,188 | 12/1990 | Kotzin et al. | 375/34 |
| 5,148,488 | 9/1992 | Chen et al. | 381/47 |
| 5,189,701 | 2/1993 | Jain | 381/41 |
| 5,678,221 | 10/1997 | Cahill | 455/312 |
| 5,787,387 | 7/1998 | Aguilar | 704/298 |
| 5,802,109 | 9/1998 | Sano | 375/245 |
| 5,933,801 | 8/1999 | Fink et al. | 704/208 |

FOREIGN PATENT DOCUMENTS

| | | |
|---|---|---|
| 0298621 | 1/1989 | European Pat. Off. . |
| 0489543 A2 | 11/1991 | European Pat. Off. . |
| 2258936A | 2/1993 | United Kingdom . |
| WO 96 06496A | 2/1996 | WIPO . |

*Primary Examiner*—Krista Zele
*Assistant Examiner*—Allan Hoosain
*Attorney, Agent, or Firm*—Nixon & Vanderhye P.C.

[57] ABSTRACT

An apparatus for improving signal quality in a communications link includes apparatus for regenerating only the speech-like characteristics of signals received over the communications link so that an estimate of the original speech signal can be retransmitted. The apparatus may include a vocal tract model coupled to a synthesizer.

17 Claims, 4 Drawing Sheets

TELECOMMUNICATIONS SYSTEM

This is a file wrapper continuation of application Ser. No. 08/648,610, filed May 16, 1996, now abandoned.

BACKGROUND OF THE INVENTION

1. Field of the Invention

This invention relates to telecommunications systems, and is concerned in particular with improving the quality of speech signals transmitted over telecommunications networks.

2. Related Art

Signals carried over telecommunications networks are subject to degradation from interference, attenuation, data compression, packet loss, and limitations in digitisation processes. It is desirable to monitor signals at intermediate points in their transmission paths to identify any imperfections and, if possible, to "repair", the signal; that is, to restore the original signal. Provided that this is done before the signal has degraded to the point where it is no longer possible to discern its content at all, the "repaired" signal can then be retransmitted. The process can be repeated as often as necessary, according to the length of the transmission path and the degree of degradation.

Data signals are comparatively easy to repair as they comprise a limited number of characters: (e.g. binary 1s and 0s; the twelve-character DTMF (dual tone multiple frequency) system, or the various QAM (quadrature amplitude modulation) constellations. Repair of such signals is carried out by identifying which of the "permitted" characters is closest to the degraded one actually received, and transmitting that character. For example, in a binary system, any signal value exceeding a threshold value may be interpreted as a "1", and any below the threshold as a "0". Check digits and other means may be included in the transmission to further improve the integrity of the transmission.

However, speech signals do not have a limited character set of this kind, and it is thus more difficult to identify automatically whether the signal has been degraded at all, still less how to restore the original signal.

SUMMARY OF THE INVENTION

According to a first aspect of the invention there is provided a method of analysing a degraded speech signal received over a telecommunications system, and restoring the signal to an estimation of its original form, comprising the steps of:

analysing the signal to identify parameters indicative of the speech content of the signal;

regenerating a speech signal from the parameters so identified; and applying the resulting speech signal to an input of the communications system.

According to a second aspect of this invention there is provided an apparatus for analysing a degraded speech signal received over a telecommunications system, and restoring the signal to an estimation of its original form, the apparatus comprising:

means for analysing the signal to identify parameters indicative of the speech content of the signal; and means for regenerating a speech signal from the parameters so identified.

In one embodiment of the invention the method comprises the steps of:

applying to an output of the communications system a recognition process in which the speech elements of the incoming signal are estimated;

synthesising a speech signal having said estimated speech elements; and adapting the macro-properties of the speech elements in the synthesised signal so that the properties of the adapted synthesised signal match those of the output signal.

The term 'macro-properties' is used in this specification to mean the properties of each speech element which vary between talkers, as distinct from the "microstructure", which determines the individual phonemes being spoken.

Preferably in this embodiment the durations, glottal excitation characteristics and/or pitches of individual speech elements in the estimated signal are adapted to match those in the output signal.

In an alternative, preferred, embodiment the signal is analysed according to a spectral representation model to generate output parameters, and a signal is generated derived from the output parameters. Preferably the spectral representation model is a vocal tract model, and the regeneration of a speech signal is made using a vocal tract model.

The invention, in a further aspect, also extends to a telecommunications system having one or more interfaces with further telecommunications systems, in which each interface is provided with such apparatus for analysing and restoring signals entering and/or leaving the system.

BRIEF DESCRIPTION OF THE DRAWINGS

Embodiments of the invention will now be described, by way of example only, with reference to the accompanying drawings, in which.

BRIEF DESCRIPTION OF EXEMPLARY EMBODIMENTS

Figure 1:
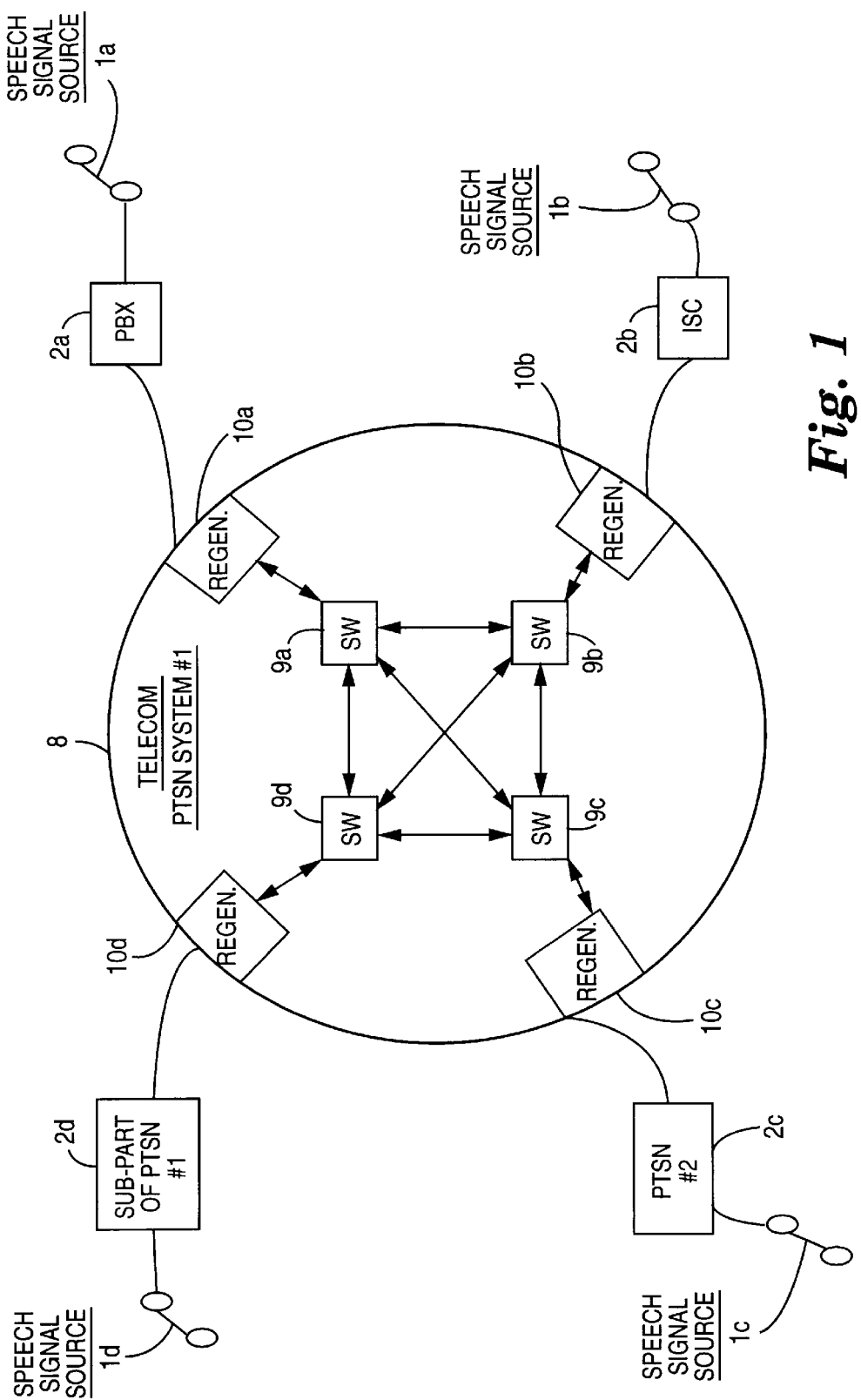
FIG. 1 shows a telecommunications network incorporating the invention.
Figure 2:
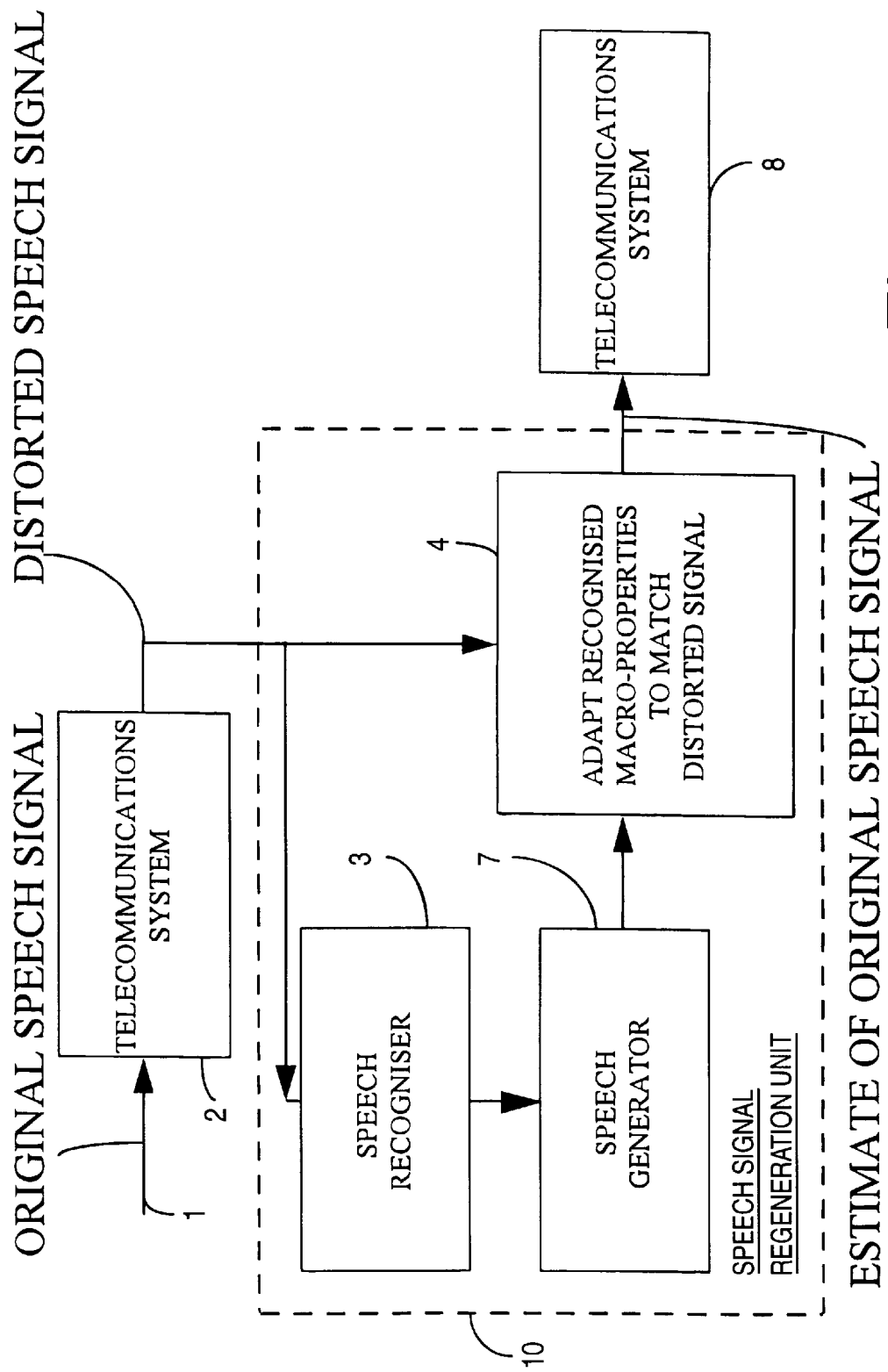
FIG. 2 shows a speech regeneration unit according to a first embodiment of the invention, illustrating the manner in which an estimated "original signal" is regenerated from a degraded input signal.

A description of the functional blocks in FIGS. 1 and 2 is given below, and includes references to established examples of each process.

FIG. 1 illustrates a generalised telecommunications system 8 comprising a number of interconnected switches 9a, 9b, 9c, 9d, and interfacing with a number of other systems 2a, 2b, 2c, 2d. As shown illustratively in FIG. 2 these may be private systems, connected to the system 8 through a private branch exchange (PBX) 2a, international networks connected to the system 8 by way of an International Switching Centre (ISC) 2b, another operator's public network 2c, or another part 2d of the same operator's network. Speech signals generated at respective sources 1a, 1b, 1c, 1d may be corrupted by the systems 2a, 2b, 2c, 2d. Speech signals entering or leaving the system 8 from or to the other systems 2a, 2b, 2c, 2d are passed through respective speech regenerators 10a, 10b, 10c, 10d. As shown, an individual operator may choose to "ring fence" his system 8 so that any signal entering the system 8 from another system 2a, 2b, 2c is repaired at the first opportunity, and any degradations to a signal are removed before it leaves the system. In a large network further speech regenerators (such as regenerator 10d) may be located within the network, thereby subdividing one operator's network into several smaller networks, 2d, 8, connected by such speech repair units.

The system to be described only handles speech signals. If the system is to be capable of handling data (e.g. facsimile) signals as well, separate means (not shown) would be necessary to identify the type of signal and apply different restoration processes, if any, to each type. Speech/data discriminators are well known in the art. For example DCME (digital circuit multiplication equipment), which uses speech compression, is provided with means for identifying the tonal signature of a facsimile transmission, and signals the equipment to provide a clear (uncompressed) transmission channel. As already indicated, data restoration processes are commonplace in the art, and will not be described further herein.

FIG. 2 shows the general arrangement of a speech regeneration unit 10, corresponding to any one of the units 10a, 10b, 10c, 10d in FIG. 1. Similarly the signal input 1 and system 2 in FIG. 2 correspond to any one of the inputs 1a, 1b, 1c, 1d and its respective system 2a, 2b, 2c or 2d.

The signal input 1 provides the original speech material received by the first telecommunications system 2. This is transmitted through the system 2 to the speech regenerator 10. In the regenerator 10 the distorted speech signal is first passed to a speech recogniser 3 which classifies the distorted speech sound, to facilitate selection of an "original sound" file from a memory store of such files forming part of the recogniser 3.

In this specification the term "speech recognition" is used to mean the recognition of speech events from a speech signal waveform. In the area of speech technology, the use of machines to recognise speech has been the goal of engineers and scientists for many years. A variety of practical speech recognisers have appeared in the literature including description of; HMM (Hidden Markov Models) Cox 1990: [Wheddon C and Linggard R: 'Speech communication', Speech and Language Processing, Chapman and Hall (1990)] fixed dimension classifiers (such as nearest neighbour, Gaussian mixtures, and multi-layer perception) [Woodland & Millar 1990: ibid], and neural arrays [Tattersall, Linford & Linggard 1990: ibid].

Most recognition systems consist of a feature extractor and a pattern matching process (classification) and can be either speaker-dependent or speaker-independent. Speaker-dependent recognisers are trained by the user with each of the words required for the particular application. Speaker-independent recognition systems have a prescribed vocabulary which cannot be changed [Wheddon C & Linggard R: 'Speech communication', Speech and Language Processing, Chapman & Hall (1990)]. In both systems features are extracted from the acoustic signal which are passed to a classifier which determines which of the words in its vocabulary was spoken. Features are extracted using transform or digital filtering techniques to reduce the amount of data passed to the classifier. The resulting patterns are then warped in time to optimally align with the reference patterns [Sakoe H and Chibass: 'Dynamic programming algorithm optimisation for spoken word recognition', IEEE Trans Acoust Speech and Signal Proc, 26 (1978)]. Statistical models such as hidden Markov models [Cox S J: 'Hidden Markov models for automatic speech recognition: theory and application', BT Telecom Technol J, 6, No. 2 (1988)] are also widely used. Here a sequence of features is compared with a set of probabilistically defined word models. Feature extraction and pattern matching techniques may also be extended to cope with connected words [Bridle J S, Brown M D and Chamberlain R M: 'An algorithm for connected word recognition', Automatic Speech Analysis and Recognition, Reidal Publishing Company (1984)] which is a far more complex task as the number of words is unknown and the boundaries between words cannot be easily determined in real time. This results in increased computation time [Atal B S and Rabiner L R: 'Speech research directions', AT&T Technical Journal 65, Issue 5 (1986)] and a corresponding increase in hardware complexity.

Hidden Markov Models suitable for the present purpose are described in Baun L E, "An Inequality and Associated Maximisation Technique in Statistical Estimation for Probabilistic Functions of Markov Processes" Inequalities III, 1–8, 1972, or Cox S J, "Hidden Markov Models For Automatic Speech Recognition: Theory and Application", in "Speech and Language Processing" edited by Wheddon C and Linggard R, Chapman and Hall, ISBN 0 412 37800 0, 1990. The HMM represents known words as a set of feature vectors, and, for a given incoming word, calculates the a posteriori probability that its model will produce the observed set of feature vectors. A generic "original sound" file can then be selected from memory for the recognised word.

The "original sound" file so identified is then used to control a speech generator 7 to generate an audio signal corresponding to the word.

The macroproperties of the synthesised speech generated by the generator 7 are now adapted to those of the actual speech event in an adaptor 4. The adaptor reproduces the characteristics of the original talker, specifically fundamental frequency (which reflects the dimensions of the individual's vocal tract), glottal excitation characteristics, which determine the tonal quality of the voice, and temporal warping, to fit the general template to the speed of delivery of the individual speech elements. This is to allow the general "original sound" file to be matched to the actual speech utterances, making the technique practically robust, and talker- independent. These characteristics are described in "Mechanisms of Speech recognition", W. A. Ainsworth, Pergamon Press, 1976.

The pitch (fundamental frequency) of the signal may be matched to that of the stored "original sound", by matching the fundamental frequency of each output element, or some other identifiable frequency, to that of the original voice signal so as to match the inflections of the original speaker's voice.

Glottal excitation characteristics can be produced algorithmically from analysis of the characteristics of the original signal, as described with reference to FIG. 4.3 (page 36) of the Ainsworth reference cited above.

Figure 3:
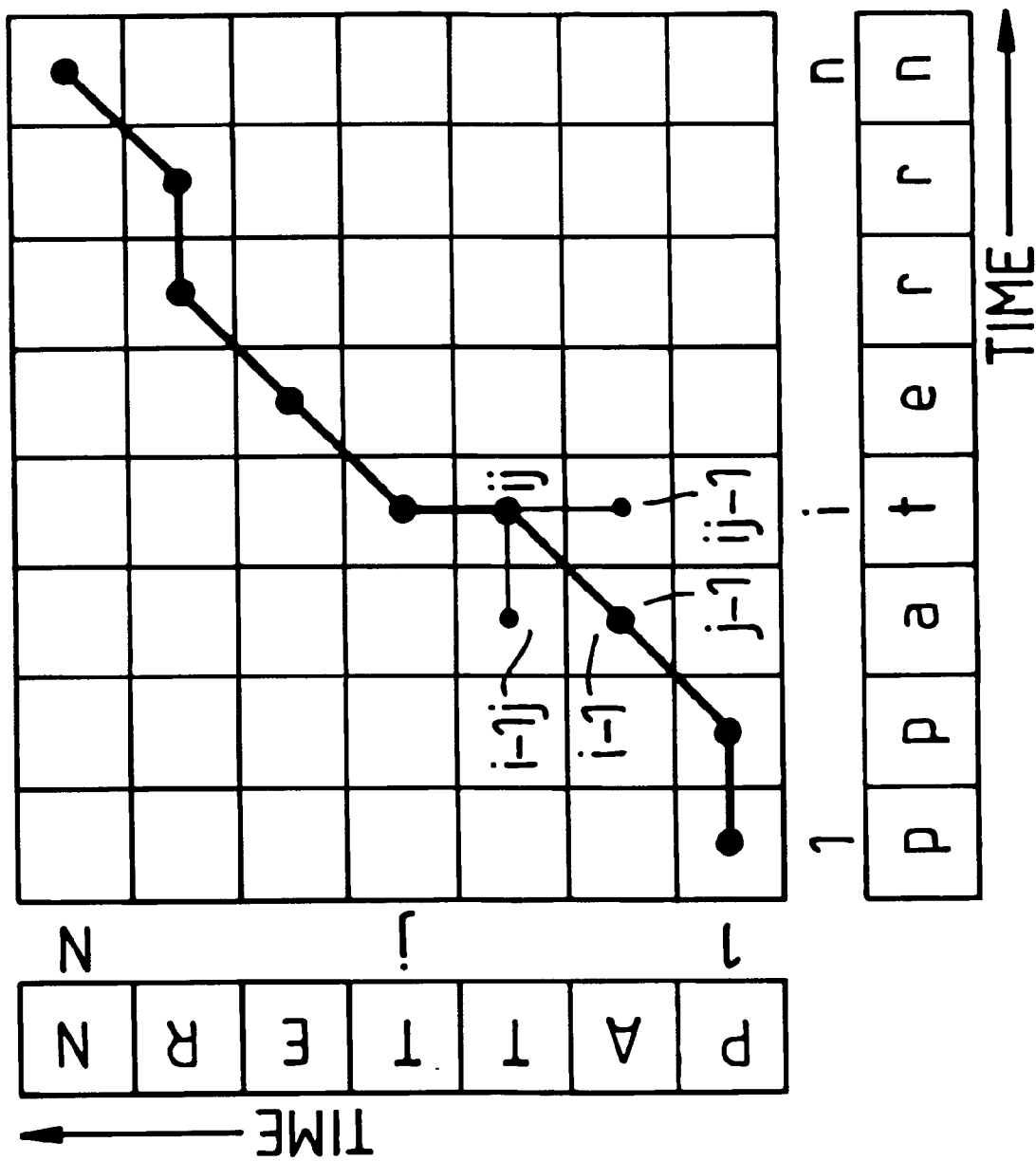
FIG. 3 illustrates a matching technique forming part of the process employed by the embodiment of FIG. 2.

The mathematical technique used for time warping, is described for example in Holmes J N, "Speech Synthesis and Recognition", Van Nostrand Reinhold (UK) Co. Ltd., ISBN 0 278 00013 4, 1988, and Bridle J S, Brown M D, Chamberlain R M, "Continuous Connected Word Recognition Using Whole Word Templates", Radio and Electronics Engineer 53, Pages 167–177, 1983. The time alignment path between the two words (uttered and recognised "original"), see FIG. 3, describes the time warping required to fit the stored "original sound" to that of the detected word. FIG. 3 shows, on the vertical axis, the elements of the recognised word "pattern", and on the horizontal axis the corresponding elements of the uttered word. It will be seen that the speaker's utterance differs from the word retrieved from the store in the length of certain elements and so, in order to match the original utterance certain elements, specifically the "p" and "r", are lengthened and others, specifically the "t", are shortened.

The regenerated signal is then output to the telecommunications system 8.

Although the speech recogniser 3, speech generator 7 and adaptor 4 have been described as separate hardware, in practice they could be realised by a single suitably programmed digital processor.

The above system requires a large memory store of recognisable speech words or word elements, and will only reproduce a speech element if it recognises it from its stored samples. Thus any sound produced at the output of the telecommunications system 2 which is not matched with one stored in the memory will be rejected as not being speech, and not retransmitted. In this way, only events in the signal content recognised as being speech will be retransmitted, and non-speech events will be removed.

Figure 4:
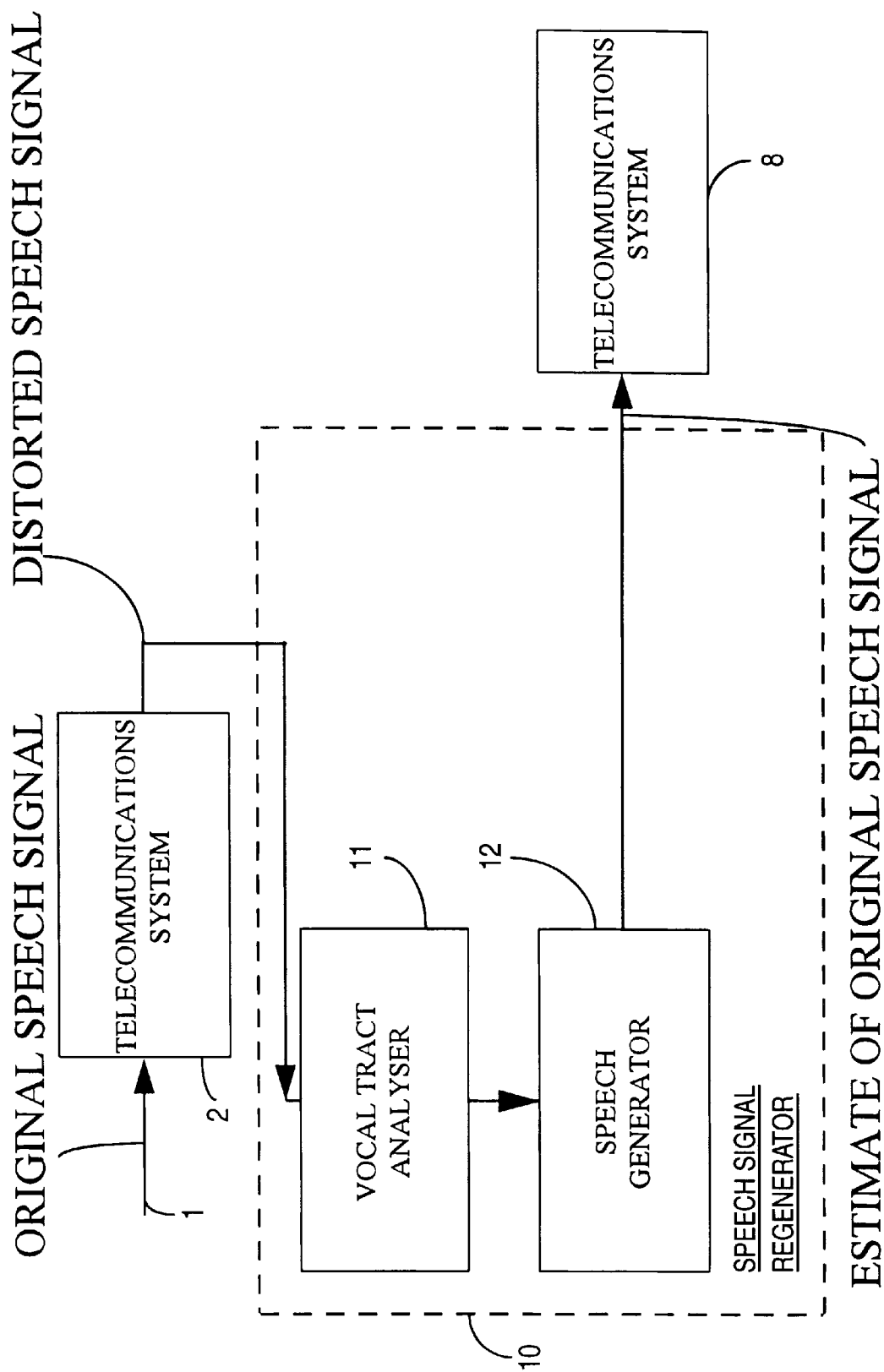
FIG. 4 shows a speech regeneration unit according to a second embodiment of the invention.

In a preferred embodiment, shown in FIG. 4, the speech regeneration unit is made up of a vocal tract analysis unit 11, the output of which is fed to a vocal tract simulator 12 to generate a speech-like signal. This system has the advantage that non-speech-like parameters are removed from otherwise speech-like events, instead of each event being accepted or rejected in its entirety.

The vocal tract analysis system stores the characteristics of a generalised natural system (the human vocal tract) rather than a "library" of sounds producable by such a system. The preferred embodiment of FIG. 4 therefore has the advantage over the embodiment of FIG. 2 that it can reproduce any sound producable by a human vocal tract. This has the advantages that there is no need for a large memory store of possible sounds, nor the consequent processing times involved in searching it. Moreover, the system is not limited to those sounds which have been stored. It is appropriate here to briefly discuss the characteristics of vocal tract analysis systems. The vocal tract is a non-uniform acoustic tube which extends from the glottis to the lips and varies in shape as a function of time [Fant G C M, "Acoustic Theory of Speech Production", Mouton and Co., 's-Gravehage, the Netherlands, 1960]. The major anatomical components causing the time varying change are the lips, jaws, tongue and velum. For ease of computation it is desirable that models for this system are both linear and time-invariant. Unfortunately, the human speech mechanism does not precisely satisfy either of these properties. Speech is a continually time varying-process. In addition, the glottis is not uncoupled from the vocal tract, which results in non-linear characteristics [Flanagan J L "Source-System Interactions in the Vocal Tract", Ann. New York Acad. Sci 155, 9–15, 1968]. However, by making reasonable assumptions, it is possible to develop linear time invariant models over short intervals of time for describing speech events [Markel J D, Gray A H, "Linear Prediction of Speech", Springer-Verlag Berlin Heidelberg New York, 1976]. Linear predictive codecs divide speech events into short time periods, or frames, and use past speech frames to generate a unique set of predictor parameters to represent the speech in a current frame [Atal B S, Hanauer S L "Speech Analysis and Synthesis by Linear Prediction of the Speech Wave" J. Acoust. Soc. Amer., vol. 50, pp. 637–655,1971]. Linear predictive analysis has become a widely used method for estimating such speech parameters as pitch, formants and spectra. Auditory models (time/frequency/amplitude spectrograms) rely on audible features of the sound being monitored, and take no account of how they are produced, whereas a vocal tract model is capable of identifying whether the signal is speech-like, i.e. whether a real vocal tract could have produced it. Thus inaudible differences, not recognised by auditory models, will nevertheless be recognised by a vocal tract model.

A vocal tract model suitable for use in the analysis is the Linear Predictive Coding model as described in Digital Processing of Speech Signals: Rabiner L. R.; Schafer R. W; (Prentice-Hall 1978) page 396.

The parameters generated by the vocal tract model 11 identify the speech-like characteristics of the original signal. Any characteristics which are not speech-like are unable to be modelled by the vocal tract model, and will therefore not be parameterised.

The parameters generated by the vocal tract model are used to control a speech production model 12. The parameters modify an excitation signal generated by the synthesiser, in accordance with the vocal tract parameters generated by the analyser 11, to generate a speech like signal including the speech like characteristics of the signal received from the system 2, but not the distortions.

Suitable vocal tract models for use in the synthesis include the Linear Predictive Coding model described above, or a more sophisticated model such as the cascade/parallel formant synthesiser, described in the Journal of the Acoustic Society of America (Vol 67, No3, March 1980): D. H. Klatt; "Software for a Cascade/Parallel Formant Synthesiser".

It should be understood that the term "speech", as used in this specification, is used to mean any utterance of the human voice, including singing, but does not necessarily imply that the utterance has any intelligible content.

I claim:

1. A method of restoring a degraded speech signal received over a telecommunications system to an estimation of its original form in a self-contained repeater apparatus, said method comprising the steps of:

analyzing the degraded speech signal in said self-contained repeater apparatus to identify parameters indicative of the speech content of the signal;

regenerating a speech signal in said self-contained repeater apparatus from the parameters so identified; and applying the resulting regenerated speech signal to an input of the communications system.

2. A method as in claim 1 comprising the steps of:

applying to an output of the communications system a recognition process in which speech elements of the incoming degraded speech signal are estimated;

synthesizing a speech signal having said estimated speech elements; and adapting the macro-properties of the speech elements in the synthesized signal to match those in the output signal.

3. A method as in claim 2, wherein the durations and/or pitches of individual speech elements in the estimated signal are adapted to match those in the output signal.

4. A method as in claim 1, wherein the signal is analyzed according to a spectral representation model to generate output parameters, and the signal regenerated is derived from the output parameters.

5. A method as in claim 4 wherein the spectral representation is a vocal tract model.

6. A method as in claim 4, wherein the regeneration of a speech signal is made using a vocal tract model.

7. A self-contained repeater apparatus for restoring a degraded speech signal received over a telecommunications system to an estimation of its original form, the self-contained repeater apparatus comprising:

means for analyzing the degraded speech signal to identify parameters indicative of the speech content of the signal;

means for regenerating the speech signal from the parameters so identified; and means for using the regenerated speech signal to apply a restored speech signal for onward transmission.

8. A self-contained repeater apparatus as in claim 7, wherein said means for analyzing and said means for regenerating comprise:

speech recognition means for applying to a first, degraded, signal a recognition process in which elements of an incoming signal are estimated;

speech synthesis means for synthesizing a speech signal having said estimated speech elements; and speech adaptation means for adapting the macro-properties of the speech elements in the synthesized signal to match those in the first signal to general a signal corresponding to the first signal without the degradation.

9. Apparatus as in claim 8, wherein the speech adaptation means includes means for modifying the durations and/or pitches of individual speech elements in the estimated signal to match those in the first signal.

10. A telecommunications system having one or more interfaces with further telecommunications systems in which each interface is provided with self-contained repeater apparatus according to claim 8 for analyzing and restoring degraded speech signals entering the system and/or analyzing and restoring signals leaving the system.

11. Apparatus as in claim 7, wherein said means for analyzing the signal uses a spectral representation to generate output parameters, and said means for using generates an output signal derived from the output parameters.

12. Apparatus as in claim 11, wherein the spectral representation includes a vocal tract model.

13. Apparatus as in claim 11, wherein the means for regeneration of a speech signal includes a vocal tract model.

14. A method for restoring a degraded speech signal within a telecommunications network for onward transmission using a self-contained repeater apparatus, said method comprising the steps of:

analyzing in said self-contained repeater apparatus a possibly degraded input speech signal with respect to expected content representing human-generated acoustic speech;

generating in said self-contained repeater apparatus a restored digital speech signal from the input signal based on said analyzing step so that the restored digital speech signal exhibits less degradation than the input signal; and transmitting said restored digital speech signal onward from said self-contained repeater apparatus toward an ultimate speech signal receiver.

15. Self-contained repeater apparatus for restoring a degraded speech signal within a telecommunications network for onward transmission, said self-contained repeater apparatus comprising:

means for analyzing a possibly degraded input speech signal with respect to expected content representing human-generated acoustic speech;

means for generating a restored speech signal from the input signal based on said analyzing step so that the restored speech signal exhibits less degradation than the input signal; and means for transmitting said restored speech signal onward toward an ultimate speech signal receiver.

16. A method for repeating digitized voice signals within a telecommunications system, said method comprising:

receiving at an intermediate repeater site, first digitized voice signals emanating from a first remote port of the telecommunications system;

regenerating analog speech signals from said first digitized voice signals at said repeater site;

digitizing said regenerated speech signals at said repeater site to produce second digitized voice signals; and transmitting said second digitized voice signals onward from said repeater site towards a second remote port of the telecommunications system.

17. Apparatus for repeating digitized voice signals within a telecommunications system, said apparatus comprising:

means for receiving, at an intermediate repeater site, first digitized voice signals emanating from a first remote port of the telecommunications system;

means for regenerating analog speech signals from said first digitized voice signals at said repeater site;

means for digitizing said regenerated speech signals at said repeater site to produce second digitized voice signals; and means for transmitting said second digitized voice signals onward from said repeater site towards a second remote port of the telecommunications system.

* * * * *